US011736756B2

(12) United States Patent
Vats

(10) Patent No.: US 11,736,756 B2
(45) Date of Patent: Aug. 22, 2023

(54) PRODUCING REALISTIC BODY MOVEMENT USING BODY IMAGES

(71) Applicant: Nitin Vats, Bengaluru (IN)

(72) Inventor: Nitin Vats, Bengaluru (IN)

( * ) Notice: Subject to any disclaimer, the term of this patent is extended or adjusted under 35 U.S.C. 154(b) by 0 days.

(21) Appl. No.: 16/077,066

(22) PCT Filed: Feb. 10, 2017

(86) PCT No.: PCT/IB2017/050753
§ 371 (c)(1),
(2) Date: Aug. 10, 2018

(87) PCT Pub. No.: WO2017/137948
PCT Pub. Date: Aug. 17, 2017

(65) Prior Publication Data
US 2019/0082211 A1    Mar. 14, 2019

(30) Foreign Application Priority Data
Feb. 10, 2016  (IN) .......................... 2584/DEL/2015

(51) Int. Cl.
*G06T 13/40* (2011.01)
*H04N 21/43* (2011.01)
(Continued)

(52) U.S. Cl.
CPC ....... *H04N 21/43074* (2020.08); *G06F 3/011* (2013.01); *G06T 1/0007* (2013.01);
(Continued)

(58) Field of Classification Search
CPC ......... G10L 2021/105; G06T 13/00–80; G06T 17/00–30; G06T 1/0007; G06T 7/215;
(Continued)

(56) References Cited

U.S. PATENT DOCUMENTS

| 5,963,217 A | * | 10/1999 | Grayson | ........ H04N 21/440236 |
| | | | | 345/473 |
| 5,990,901 A | * | 11/1999 | Lawton | ................. G06T 15/503 |
| | | | | 345/581 |

(Continued)

OTHER PUBLICATIONS

Chen et al., "PoseShop: Human Image Database Construction and Personalized Content Synthesis", 2013, IEEE Transactions on Visualization and Computer Graphics, vol. 19, No. 5, pp. 824-837 (Year: 2013).*

(Continued)

*Primary Examiner* — Phong X Nguyen
(74) *Attorney, Agent, or Firm* — Crose Law LLC; Bradley D. Crose

(57) ABSTRACT

A method for providing visual sequences using one or more images comprising:
receiving one or more person images of showing atleast one face,
using a human body information to identify requirement of the other body part/s;
receiving atleast one image or photograph of other human body part/s based on identified requirement;
processing the image/s of the person with the image/s of other human body part/s using the human body information to generate a body model of the person, the virtual model comprises face of the person,
receiving a message to be enacted by the person, wherein the message comprises atleast a text or a emotional and movement command,
processing the message to extract or receive an audio data related to voice of the person, and a facial movement data related to expression to be carried on face of the person,
processing the body model, the audio data, and the facial movement data, and generating an animation of the body model of the person enacting the message, (Continued)

Wherein emotional and movement command is a GUI or multimedia based instruction to invoke the generation of facial expression/s and or body part/s movement.

15 Claims, 12 Drawing Sheets

(51) Int. Cl.
| | |
|---|---|
| *H04L 12/18* | (2006.01) |
| *G06T 7/215* | (2017.01) |
| *G06F 3/01* | (2006.01) |
| *G06T 1/00* | (2006.01) |
| *H04N 7/15* | (2006.01) |

(52) U.S. Cl.
CPC .............. *G06T 7/215* (2017.01); *G06T 13/40* (2013.01); *H04L 12/18* (2013.01); *H04N 7/157* (2013.01)

(58) Field of Classification Search
CPC .. G06T 13/40; H04N 21/43074; H04N 7/157; G06F 3/011; H04L 12/18
See application file for complete search history.

(56) References Cited

U.S. PATENT DOCUMENTS

| | | | | |
|---|---|---|---|---|
| 6,539,354 | B1* | 3/2003 | Sutton | G10L 13/00 704/E21.02 |
| 6,661,418 | B1* | 12/2003 | McMillan | G06T 13/205 704/E21.02 |
| 6,766,299 | B1* | 7/2004 | Bellomo | G10L 21/06 704/276 |
| 7,386,799 | B1* | 6/2008 | Clanton | A63F 13/12 715/758 |
| 7,671,861 | B1* | 3/2010 | Ostermann | G06T 13/40 345/475 |
| 9,082,400 | B2* | 7/2015 | Rezvani | G10L 13/10 |
| 9,400,921 | B2* | 7/2016 | Bouguet | G06T 17/00 |
| 9,479,736 | B1* | 10/2016 | Karakotsios | H04N 5/265 |
| 10,178,218 | B1* | 1/2019 | Vadodaria | G06F 40/35 |
| 2002/0024519 | A1* | 2/2002 | Park | G06T 13/40 345/473 |
| 2007/0126733 | A1* | 6/2007 | Yang | G06T 13/40 345/419 |
| 2007/0216675 | A1* | 9/2007 | Sun | G06T 11/00 345/419 |
| 2008/0309671 | A1* | 12/2008 | Shuster | G06T 13/20 345/474 |
| 2010/0030578 | A1* | 2/2010 | Siddique | H04W 4/00 705/26.1 |
| 2010/0082345 | A1* | 4/2010 | Wang | G10L 13/00 704/E21.02 |
| 2011/0007079 | A1* | 1/2011 | Perez | A63F 13/56 345/473 |
| 2011/0304629 | A1* | 12/2011 | Winchester | G06T 13/40 345/473 |
| 2012/0026174 | A1* | 2/2012 | McKeon | G06T 13/40 345/473 |
| 2012/0069028 | A1* | 3/2012 | Bouguerra | H04L 51/046 715/810 |
| 2012/0092445 | A1* | 4/2012 | McDowell | G06V 40/167 348/14.16 |
| 2012/0130717 | A1* | 5/2012 | Xu | G06T 13/40 345/473 |
| 2012/0280974 | A1* | 11/2012 | Wang | G10L 21/10 345/419 |
| 2012/0310791 | A1* | 12/2012 | Weerasinghe | H04N 21/47815 705/27.2 |
| 2013/0342527 | A1* | 12/2013 | Molyneaux | A63F 13/213 345/419 |
| 2014/0078144 | A1* | 3/2014 | Berriman | A63F 13/61 345/426 |
| 2014/0139619 | A1* | 5/2014 | Wang | H04N 21/44008 348/14.12 |
| 2014/0235348 | A1* | 8/2014 | Liang | A63B 60/46 463/36 |
| 2014/0267413 | A1* | 9/2014 | Du | G06V 40/171 345/633 |
| 2014/0267544 | A1* | 9/2014 | Li | G06V 40/176 348/14.02 |
| 2014/0362091 | A1* | 12/2014 | Bouaziz | G06T 7/292 345/473 |
| 2015/0022550 | A1* | 1/2015 | Katpally Reddy | G06T 19/006 345/632 |
| 2015/0042663 | A1* | 2/2015 | Mandel | G06T 13/40 345/474 |
| 2015/0052084 | A1* | 2/2015 | Kolluru | G06T 13/40 706/11 |
| 2015/0055085 | A1* | 2/2015 | Fonte | G02C 7/027 700/98 |
| 2015/0138308 | A1* | 5/2015 | Berrett | H04N 21/4788 348/14.12 |
| 2015/0255045 | A1* | 9/2015 | Li | G06T 13/80 345/629 |
| 2015/0287403 | A1* | 10/2015 | Holzer Zaslansky | G06T 13/205 704/231 |
| 2015/0379623 | A1* | 12/2015 | Gadre | G06Q 50/01 705/27.2 |
| 2016/0027200 | A1* | 1/2016 | Corazza | G06T 15/04 345/420 |
| 2016/0110922 | A1* | 4/2016 | Haring | G06T 13/40 345/633 |
| 2016/0134840 | A1* | 5/2016 | McCulloch | G06V 40/165 348/14.03 |
| 2016/0219265 | A1* | 7/2016 | Adeyoola | G06F 16/54 |
| 2017/0123752 | A1* | 5/2017 | Nadler | G06T 13/205 |
| 2018/0232934 | A1* | 8/2018 | Schmidt | G06Q 10/10 |
| 2019/0035149 | A1* | 1/2019 | Chen | G06V 40/166 |
| 2022/0044463 | A1* | 2/2022 | Kang | G06T 13/205 |
| 2023/0120883 | A1* | 4/2023 | Makeev | G06T 17/00 345/474 |

OTHER PUBLICATIONS

Wang et al., High Quality Lip-Sync Animation for 3D Photo-Realistic Talking Head, 2012 (Year: 2012).*

Afifi et al., Video Face Replacement System Using a Modified Poisson Blending Technique, 2014 (Year: 2014).*

Wang et al., HMM trajectory-guided sample selection for photo-realistic talking head, 2015 (Year: 2015).*

* cited by examiner

PRODUCING REALISTIC BODY MOVEMENT USING BODY IMAGES

FIELD OF THE INVENTION

The invention relates to processing of text and/or audio and/or video and images of a person to convert it into a video with talking face and moving body in realistic manner,

BACKGROUND

Video and animation when stored requires a huge amount of memory with respect to images, audio or text. Even for transmission of videos or animation requirement of network bandwidth is high in comparison to image, audio or text. However, at the same time, the clarity of information is well delivered when it is received by the receiver as a video or animation rather than text, audio or images.

In current scenario, video chatting over mobile network or video messaging suffer from lag in timing due to bandwidth crunch and there is no solution available for quality video chatting on low bandwidth network.

Another problem is the limitation of applications which can introduce creativity in image of some person to make it speak and move body in realistic manner. Available applications make the lipsing or movement which are just morphing and look artificial and bad.

One possible way to deal with this scenarios, is to compress the video and then transmit the compressed video and animations. Some known compression techniques for videos are MPEG-1, MPEG-2, MPEG-4, H.263, H.264, H.265, etc. However, most of the video compression techniques are lossy compressions. Such lossy compressions substantially reduce the information rendered, which affects quality of information received by the receiver or the viewer. AT the same time, if lossless compression techniques are used, than the compression of data is insubstantial and still required high data storage for storing the data or high bandwidth for transmitting the data. Another possible way for dealing with bandwidth crunch, is to divide a video into network packets and then transmit the video as network packets over the network. However, such transmission for real-time video viewing required high network speed and also this scenario is limited only for transmission of video and not to the storage of video.

Also, the videos and animations are first need to be created and then delivered to the receiver for his/her viewing. For making such videos is time consuming and inconvenient as the producer of the video require perfect environment and equipment before creating videos. When the videos involves series of body movements which means lot of data per frame is changing, the storage and bandwidth requirement is still higher. Anything which is missing result in unrealistic videos with high storage and bandwidth requirements.

It is always a fun to chat and use profile image with changed dress, makeup on regular basis. Many times full body photo is not that perfect and user can't do any editing in terms of perfectly showing person with realistic changed cloths/accessories. There is no solution available if someone want to chat with business purpose where he/she can show up in formal dressing, and while talking to friend in casual wearing, without changing any part of attire during a particular instance. It is tough to use multiple profile images for particular purpose while on virtual chat.

OBJECT OF THE INVENTION

The object of the invention is to provide realistic viewing experience of body movements, while still keeping the storage and bandwidth requirement for the information low.

SUMMARY OF THE INVENTION

The object of the invention is achieved by method provided in Claim 1

According to an embodiment of the method, the method includes:

receiving one or more person images of showing atleast one face, using a human body information to identify requirement of the other body part/s;

receiving atleast one image or photograph of other human body part/s based on identified requirement;

processing the image/s of the person with the image/s of other human body part/s using the human body information to generate a body model of the person, the virtual model comprises face of the person, receiving a message to be enacted by the person, wherein the message comprises atleast a text or a emotional and movement command, processing the message to extract or receive an audio data related to voice of e person, and a facial movement data related to expression to be carried on face of the person, processing the body model, the audio data, and the facial movement data, and generating an animation of the body model of the person enacting the message, Wherein emotional and movement command is a GUI or multimedia based instruction to invoke the generation of facial expression/s and or body part/s movement.

According to another embodiment of the method, wherein the message is received as an input from a user.

According to yet another embodiment of the method, wherein the message comprises the audio data.

According to one embodiment of the method, wherein the message comprises a body movement data related to movement of body part/s of the person, the method comprises:

processing the body model, the audio data, the body movement data and the facial movement data, and generating an animation of the body model of the person enacting the message with movement of body part/s.

According to another embodiment of the method, the method includes:

processing atleast one of the message and the audio data to producing a lipsing data;

processing, the body model, the audio data, the facial movement data, the lipsing data and generating an animation of the body model of the person enacting the message with lipsing.

According to yet another embodiment of the method, wherein the image/s comprises faces of more than one person, the method includes:

receiving the messages to be enacted by the persons in an order, processing the messages to extract or receive the audio data related to voice of the persons, and the facial movement data related to expressions to be carried on faces of the persons, processing the body models of the persons, the audio data, and the facial movement data, and generating an animation of the body models of the persons enacting the messages in the respective order as provided.

According to one embodiment of the method, the method includes receiving a selection input to select one or more person with face/s from the image/s received, generating a scene showing one or more body model/s of person/s with face/s based on the selection input, processing, the scene, the audio data, and the facial movement data, and generating an animation of the body model/s of the person/s enacting the message.

According to another embodiment of the method, the method includes receiving a chat request made by an user with atleast one another user, establishing a chat environment between the users based on the chat request, receiving atleast one image representative of atleast one of the users, wherein the image comprising atleast one face, using a human body information to identify requirement of the other body part/s;

receiving atleast one image or photograph of other human body part/s based on identified requirement;

processing the image/s of the person with the image/s of other human body part/s using the human body information to generate body model/s of the person, the body model comprises face of the person, receiving a message from atleast one of the users in the chat environment, wherein the message comprises atleast a text or a emotional and movement command, processing the message to extract or receive the audio data related to voice of the person, and the facial movement data related to expression to be carried on face of the person, processing the body model/s, the audio data, and the facial movement data, and generating the animation of the body model/s of the person/s enacting the message and displaying the animation in the chat environment. The emotional and movement command is a GUI or multimedia based instruction to invoke the generation of facial expression/s and or body part/s movement.

According to yet another embodiment of the method, wherein the message from a first computing device is received at a second computing device, and processing the body model/s, the audio data, and the facial movement data, and generating the animation of the person enacting the message in the chat environment, and displaying the animation on a display of the second computing device in the chat environment.

According to one embodiment of the method, the method includes:

receiving atleast one image representative of more than one users in the chat environment, using human body information related to each of the users whose image/s is received to identify requirement of the other body part/s for each of the users;

receiving atleast one image or photograph of other human body part/s for each of the users whom other body part/s are required;

processing the image/s of the person with the image/s of other human body part/s using the human body information to generate body models of each of the persons for whom the other body part/s are required, the body model comprises face of the persons, processing the body models, images of the person/s for whom the other body part/s were not required and generating a scene showing the users in the chat environment, receiving a message from atleast one of the users in the chat environment, wherein the message comprises atleast a text or a emotional and movement command, processing the message to extract or receive the audio data related to voice of the person, and the facial movement data related to expression to be carried on face of the person, processing the scene, the audio data, and the facial movement data, and generating an animation of the persons enacting the message in the chat environment within the scene, Wherein emotional and movement command is a GUI or multimedia based instruction to invoke the generation of facial expression/s and or body part/s movement.

According to another embodiment of the method, the method includes:

receiving a wearing inputelated to a body part of the body model onto which a fashion accessory is to be worn;

processing the wearing input and identifying body part/s of the body model onto which the fashion accessory is to be worn;

receiving an image/video of the accessory according to the wearing input;

processing the identified body part/s of the body model and the image/video of the accessory and generating a view showing the body model wearing the fashion accessory, processing the view, the audio data, and the facial movement data, and generating an animation of the persons enacting the message wearing the fashion accesory.

According to yet another embodiment of the method, the method includes:

receiving a target image showing a face of another person or animal, processing the body model and the target image to generate a morphed body model showing the face from the target image on the person's body model, processing the morphed body model, the audio data, and the facial movement data, and generating an animation of the morphed body model enacting the message.

According to one embodiment of the method, the method includes:

receiving an image of a cloth;

Combining the body model of the person and the image of the cloth to show the body model of the person wearing the cloth.

According to another embodiment of the method, the method includes:

receiving an animation input related to nodes of skeleton of the body model, wherein the skeleton of the body model is thinned down structure of the body model;

processing the body model, the audio data, and the facial movement data, and generating an animation of the body model of the person enacting the message.

According to yet another embodiment of the method, the method includes:

receiving atleast one image representative of more than one persons, using human body information related to each of the users whose image/s is received to identify requirement of the other body part/s for each of the users;

receiving atleast one image or photograph of other human body part/s for each of the users for whom other body part/s are required;

processing the image/s of the person with the image/s of other human body part/s using the human body information to generate body models of each of the persons for whom the other body part/s are required, the body model comprises face of the persons, processing the body models, images of the person/s for whom the other body part/s were not required and generating a scene showing the users in the chat environment, receiving a message for mutual interaction among users in the scene, wherein the message comprises atleast a text or an emotional and movement command, processing the message to extract or receive the audio data related to voice of the person, and the facial movement data related to expression to be carried on face of the person, processing the scene, the audio data, and the facial movement data, and generating of the persons enacting the message within the scene, Wherein emotional and movement command is a GUI or multimedia based instruction to invoke the generation of facial expression/s and or body part/s movement.

BRIEF DISCUSSION OF DRAWINGS

FIG. 8(a)-FIG. 8(c) illustrates mutual interaction of two users during chat and changing environment.

FIG. 9(a)-FIG. 9(b) illustrates mutual interaction of two users during chat and changing environment while they are driving bike.

FIG. 10(a)-FIG. 10(b) illustrates the points showing facial feature on user face determined by processing the image using trained model to extract facial feature and segmentation of face parts for producing facial expressions while FIG. 10(c)-(f) shows different facial expression on user face produced by processing the user face.

Figure 11:
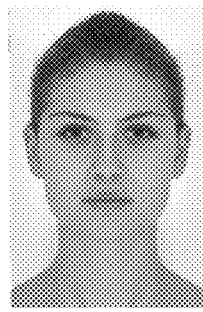
Figure 11:
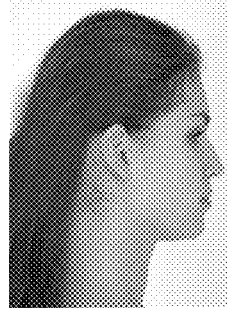
Figure 11:
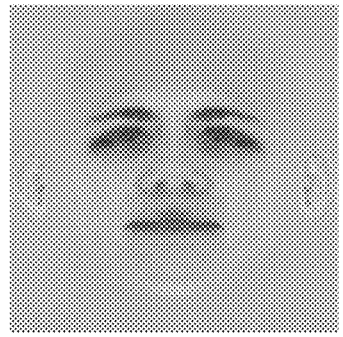

FIG. 11(a)-(c) illustrates the user input of front and side image and face unwrap.

Figure 12:
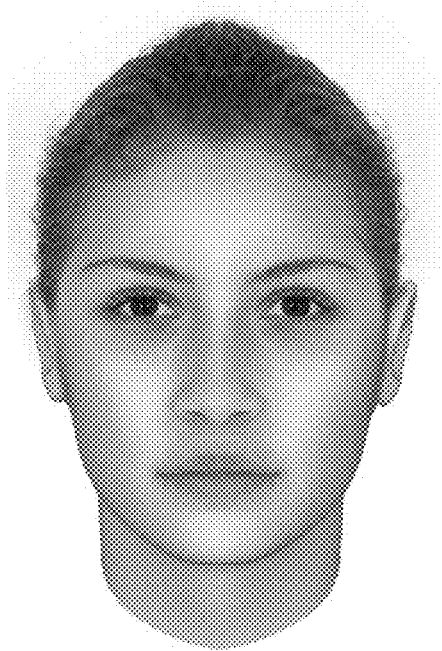
Figure 12:
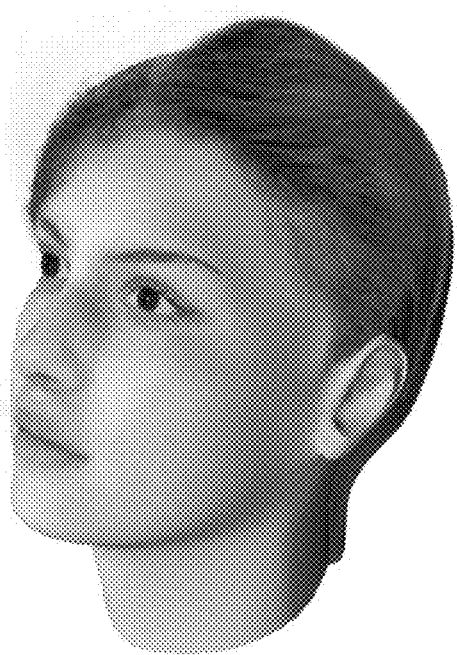

FIG. 12(a)-FIG. 12(b) illustrates the face generated in different angle and orientation by generated 3d model of user face.

DETAILED DESCRIPTION

In one embodiment of the invention, following components are used to implement the features of the invention:

Input data comprising image/video which comprises the face of a person,

Emotion & movement command, video, text or audio or combination thereof. The emotion & movement command may be smiley, text, symbol or any other kind of input for showing mood expression on face or body part or combination thereof and output is animated message, chat or live video call experience.

The input data for generating body model requires the body type, size features or full body image with which the figure of user can be extracted.

The Database include, Database for image processing, Database for user information and relationship, Database for human body model generation, Supporting Libraries.

Database for image processing includes Images, images of user having face, pre rigged images of user, body model of user, 3D model of user, videos/animations, Video/animation with predefined face location, image/video of animation of other characters, Images related to makeup, clothing and accessories, skeleton information related to user image/body model, image/video of environment, Trained model data which is generated by training with lots of faces/body and help in quickly extracting facial and body features.

Database for user information and relationship includes, user profile data, relationship with various other users, interest in activities/group.

Database for human body model generation includes image/s or photograph/s of other human body part/s, Image/s or cloths/accessories, Image of background and images to producing shades and/or user information that includes information about human body information which is either provided by user as user input or generated by processing the user input comprises user image/s it can be used for next time when user is identify by some kind of login identity, then user will not require to generate the user body model again but can retrieve it from user data and try cloths on it and/or user data which includes generated user body after processing the user image that can be used next time and/or graphics data which includes user body part/s in graphics with rig which can be given animation which on processing with user face produces a user body model with cloths and it can show animation or body part movements wherein human body information comprises atleast one of orientation of face of the person in the image of the person, orientation of body of the person in the image of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof.

The facial feature information comprises at least one of shape or location of atleast face, eyes, chin, neck, lips, nose, or ear, or combination thereof.

Supporting Libraries includes one or more libraries described as follows; facial feature extraction trained model, skeleton information extraction model, tool to create animation in face/body part/s by trigger of Emotion & movement command, it may be smiley, text, symbol at client device, animation generation engine, skeleton animation generation engine, facial feature recognition engine, skeleton information extraction engine, text to voice conversion engine, voice learning engine from set of voice samples to convert voice of text in user, image morphing engine, lipsing & facial expression generation engine based on input voice, face orientation and expression finding engine form a given video, Facial orientation recognition and matching model, model for extracting facial features/lipsing from live video, tool to wrap or resize the makeup/clothing accessories images as per the face in the image, 3D face/body generation engine from images. libraries for image merging/blending, 3d model generation using front and side image of user face, rigging generation on user body model with or without cloths.

For rendering output of the method, the display can be a wearable display or a non-wearable display or combination thereof.

The non-wearable display includes electronic visual displays such as LCD, LED, Plasma, OLED, video wall, box shaped display or display made of more than one electronic visual display or projector based or combination thereof.

The non-wearable display also includes a pepper's ghost based display with one or more faces made up of transparent inclined foil/screen illuminated by projector/s and/or electronic display/s wherein projector and/or electronic display showing different image of same virtual object rendered with different camera angle at different faces of pepper's ghost based display giving an illusion of a virtual object placed at one places whose different sides are viewable through different face of display based on pepper's ghost technology.

The wearable display includes head mounted display. The head mount display includes either one or two small displays with lenses and semi-transparent mirrors embedded in a helmet, eyeglasses or visor. The display units are miniaturized and may include CRT, LCDs, Liquid crystal on silicon (LCos), or OLED or multiple micro-displays to increase total resolution and field of view.

The head mounted display also includes a see through head mount display or optical head-mounted display with one or two display for one or both eyes which further comprises curved mirror based display or waveguide based display. See through head mount display are transparent or semitransparent display which shows the 3d model in front of users eye/s while user can also see the environment around him as well.

The head mounted display also includes video see through head mount display or immersive head mount display for fully 3D viewing by feeding rendering of same view with two slightly different perspective to make a complete 3D viewing. Immersive head mount display shows output in virtual environment which is immersive.

In one embodiment, the output moves relative to movement of a wearer of the head-mount display in such a way to give to give an illusion of output to be intact at one place while other sides of 3D model are available to be viewed and interacted by the wearer of head mount display by moving around intact 3D model.

The display system also includes a volumetric display to display the output and interaction in three physical dimensions space, create 3-D imagery via the emission, scattering, beam splitter or through illumination from well-defined regions in three dimensional space, the volumetric 3-D displays are either auto stereoscopic or auto multiscopic to create 3-D imagery visible to an unaided eye, the volumetric display further comprises holographic and highly multiview displays displaying the 3D model by projecting a three-dimensional light field within a volume.

In one embodiment of the invention, for generating a video message/chat or live call using body model of a person, the method is as follows:

receiving or more person images of showing atleast one face, using a human body information to identify requirement of the other body part/s;

receiving atleast one image or photograph of rather human body part/s based on identified requirement;

processing the image/s of the person with the image/s of other human body part/s using the human body information to generate a body model of the person, the virtual model comprises face of the person, receiving a message to be enacted by the person, wherein the message comprises atleast a text or a emotional and movement command, processing the message to extract or receive an audio data related to voice of the person, and a facial movement data, related to expression to be carried on face of the person, processing the body model, the audio data, and the facial movement data, and generating an animation of the body model of the person enacting the message, Wherein emotional and movement command is a gui or multimedia based instruction to invoke the generation of facial expression/s and or body part/s movement.

In another embodiment of the invention, for generating a body model of a person wearing a cloth, an implementation of a method is as follows:

receiving an user input related to a person, wherein the user input comprises atleast one image/photograph of the person, wherein atleast one image of the person has face of the person;

using a human body information to identify requirement of the other body part/s;

receiving atleast one image or photograph of other human body part/s based on identified requirement;

processing the image/s of the person with the image/s or photograph/s of other human body part/s using the human body information to generate a body model of the person, wherein the body model represent the person whose image/photograph is received as user input, and the body model comprises face of the person;

receiving an image of a cloth according to shape and size of the body model of the person;

Combining the body model of the person and the image of the cloth to show the body model of the human wearing the cloth;

wherein human body information comprises atleast one of orientation of face of the person in the image of the person, orientation of body of the person in the image of the person, skin tone of the person, type of body part/s shown in the image of person, location and geometry of one or more body parts in image of the person, body/body parts shape, size of the person, weight of the person, height of the person, facial feature information, or nearby portion of facial features, or combination thereof, wherein facial feature information comprises at least one of shape or location of atleast face, eyes, chin, neck, lips, nose, or ear, or combination thereof.

In one embodiment, the aspects of invention are implemented by a method using following steps:

Receiving an image having a face (in any orientation) and a input data including a text and/or Emotion & movement command and/or voice If user optionally choose to make body model of input face then input the body specification such as height, weight as mentioned above about the requirements for making body model, the body model of user is generated. This can be made every time or may be used for next time. The system extract facial feature and or skeleton information of this body model.

If the text is provided as input, converting the text into a voice

Lipsing the body model according to voice data received as input or the voice generated from the text data and accordingly generating facial expression. If emotion and movement command is provided as input data, the facial expressions are generated using a pre-determined expression based on the emotion and movement command.

Sender can also choose makeup, add clothing or accessories in image of body model.

Optionally giving body movement command to body model of user

Processing the body model with lisping with voice along with the facial expression and or with makeup/clothing accessories, body part movement (animation with skeleton information) to generate video.

This can be used for sending message, live chat and posting on social networking site.

In another alternate embodiment, the aspects of invention are implemented by a method using following steps:

Sending voice message and/or text message and/or smiley from a first mobile device to a second mobile device;

Receiving the voice message and/or text message and/or smiley on the second mobile device;

If message is just text then converting it in voice message

Optionally giving body movement command to body model of user processing the pre-selected body model of second mobile with voice In another alternate embodiment, the aspects of invention are implemented by a method using following steps:

Sending voice message and/or text message and/or smiley/emotion and movement command and/or optionally chosen image from a first mobile device to a second mobile device;

Receiving the voice message and/or text message and/or smiley on server device;

If message is just text then converting it in voice message on server

In case first mobile send image then processing that image else processing the image which is stored by second mobile for such messages on server, with voice sending the video message to second mobile.

In another alternate embodiment, the aspects of invention are implemented by a method using following steps:

Opening up a chat window of a profile holder showing a body model and text box for writing a text and/or sending a voice;

The user connected through network enter a text and/or his voice in the chat window;

The text and/or the voice entered by the online user is processed to be matched with a suitable answer from a form data filled by the profile holder.

Processing the answer with lipsing and or facial expression and or with body movement using database and different engines to generate an output Displaying the output video as answer to the question on chat window Chat may be done in a common environment which means that both of chatting partner will be shown in one environment.

In another alternate embodiment, the aspects of invention are implemented by a method using following steps:

Opening up a call window of a profile holder showing an body model of user;

The voice of the user is transmitted to another person on call;

User optionally also transfer Emotion & movement command

The voice generate lipsing on the image shown at receiver end and optionally show expression on face and body movement The same happened from the side of receiver end to user end Alternatively camera on user device capture the video of user and its lipsing is extracted and transferred to generate realistic lipsing at receiver end.

Call may be done in a common environment which means that both of chatting partner will be shown in one environment.

In all above embodiment apart from facial expression emotion and movement command can be given for body/body part movement. In all embodiment body model may be pre stored or can be made before starting chat, call or sending message.

There Exist Various Methods for Face detection which are based on either of skin tone based segmentation, Feature based detection, template matching or Neural Network based detection. For example; Seminal work of Viola Jones based on Haar features is generally used in many face detection libraries for quick face detection.

Haar Feature is define as follows:

Lets consider a term "Integral image" which is similar to the summed area table and contains entries for each location such that entry on (x, y) location is the sum of all pixel values above and left to this location.

$$ii(x, y) = \sum_{x' \leq x, y' \leq y} i(x', y')$$

where ii(x, y) is the integral image and i(x, y) is original image.

Integral image allows the features (in this method Haar-like-features are used) used by this detector to be computed very quickly. The sum of the pixels which lie within the white rectangles are subtracted from the sum of pixels in the grey rectangles. Using integral image, only six array reference are needed to compute two rectangle features, eight array references for three rectangle features etc which let features to be computed in constant time O(1).

After extracting Feature, The learning algorithm is used to select a small number of critical visual features from a very large set of potential features Such Methods use only few important features from large set of features after learning result using Learning algorithm and cascading of classifiers make this real time face detection system.

In realistic scenario users upload pics which are in different orientation and angels. For such cases, Neural Network based face detection algorithms can be used which leverage the high capacity of convolution networks for classification and feature extraction to learn a single classifier for detecting faces from multiple views and positions. To obtain the final face detector, a Sliding window approach is used because it has less complexity and is independent of extra modules such as selective search. First, the fully connected layers are converted into convolution layers by reshaping layer parameters. This made it possible to efficiently run the Convolution Neural Network on images of any size and obtain a heat-map of the face classifier.

Once we have a detected the face, the next is to find the location of different facial features (e.g. corners of the eyes, eyebrows, and the mouth, the tip of the nose etc) accurately.

For an Example; to precisely estimate the position of facial landmarks in a computationally efficient way, one can use dlib library to extract facial features or landmark points.

Some methods are based on utilizing a cascade of regressors. The cascade of regressors can be defined as follows:

Let $x_i \in R^2$ be the x, y-coordinates of the ith facial landmark in an image I. Then the vector $S=(x_1^T, x_2^T, \ldots,$ $x_p^T)^T \in R^{2p}$ denotes the coordinates of all the p facial landmarks in I. The vector S represent the shape. Each regressor, in the cascade predicts an update vector from the image. On Learning each regressor in the cascade, feature points estimated at different levels of the cascade are initialized with the mean shape which is centered at the output of a basic Viola & Jones face detector.

Thereafter, extracted feature points can be used in expression analysis and generation of geometry-driven photorealistic facial expression synthesis.

For applying makeup on lips, one need to identify lips region in face. For this, after getting facial feature points, a smooth Bezier curve is obtained which captures almost whole lip region in input image. Also, Lip detection can be achieved by color based segmentation methods based on color information. The facial feature detection methods give some facial feature points (x, y coordinates) in all cases invariant to different light, illumination, race and face pose. These points cover lip region. However, drawing smart Bezier curves will capture the whole region of lips using facial feature points.

Generally Various Human skin tone lies in a particular range of hue and saturation in HSB color space (Hue, Saturation, and Brightness). In most scenario only the brightness part varies for different skin tone, in a range of hue and saturation. Under certain lighting conditions, color is orientation invariant. The studies show that in spite of different skin color of the different race, age, sex, this difference is mainly concentrated in brightness and different people's skin color distributions have clustering in the color space removed brightness. In spite of RGB color space, HSV or YCbCr color space is used for skin color based segmentation.

Merging, Blending or Stitching of images are techniques of combining two or more images in such a way that joining area or seam do not appear in the processed image. A very basic technique of image blending is linear blending to combine or merge two images into one image: A parameter X is used in the joining area (or overlapping region) of both images. Output pixel value in the joining region:

$$P_{Joining\_Region}(i,j)=(1-X)*P_{First\_Image}(i,j)+X*P_{Second\_Image}(i,j).$$

Where 0<X<1, remaining region of images are remain unchanged.

Other Techniques such as 'Poisson Image Editing (Perez et al.)', 'Seamless Stitching of Images Based on a Haar Wavelet 2d Integration Method (Ioana et al.)' or 'Alignment and Mosaicing of Non-Overlapping Images (Yair et al.)' can be used for blending.

For achieving life-like facial animation various techniques are being used now-a day's which includes performance-driven techniques, statistical appearance models or others. To implement performance-driven techniques approach, feature points are located on the face of an uploaded image provided by user and the displacement of these feature points over time is used either to update the vertex locations of a polygonal model, or are mapped to an underlying muscle-based model.

Given the feature point positions of a facial expression, to compute the corresponding expression image, one possibility would be to use some mechanism such as physical simulation to figure out the geometric deformations for each point on the face, and then render the resulting surface. Given a set of example expressions, one can generate photorealistic facial expressions through convex combination. Let $E_i=(G_i, I_i)$, i=0, ..., m, be the example expressions where $G_i$ represents the geometry and Ii is the texture image. We assume that all the texture images $I_i$ are pixel aligned. Let $H(E_0, E_1, \ldots, E_m)$ be the set of all possible convex combinations of these examples. Then $$H(E_0, E_1, \ldots, E_m) = \left\{ \left( \sum_{i=0}^{m} c_i G_i, \sum_{i=0}^{m} c_i I_i \right) \middle| \sum_{i=0}^{m} c_i = 1, c_i \geq 0, i = 0, \ldots, m \right\}$$

While the statistical appearance models are generated by combining a model of shape variation with a model of texture variation. The texture is defined as the pattern of intensities or colors across an image patch. To build a model, it requires a training set of annotated images where corresponding points have been marked on each example. The main techniques used to apply facial animation to a character includes morph targets animation, bone driven animation, texture-based animation (2D or 3D), and physiological models.

User will be able to chat with other users when they are offline on not willing to chat with that particular user. It is a computer program which conducts a conversation via auditory or textual methods. Such programs are often designed to convincingly simulate how a human would behave as a conversational partner, thereby passing the Turing test.

This program may use either sophisticated natural language processing systems, or some simpler systems which scan for keywords within the input, and pull a reply with the most matching keywords, or the most similar wording pattern, from a database. There are two main types of programs, one functions based on a set of rules, and the other more advanced version uses artificial intelligence. The programs based on rules, tend to be limited in functionality, and are as smart as they are programmed to be. On the other end, programs that use artificial intelligence, understands language, not just commands, and continuously gets smarter as it learns from conversations it has with people. Deep Learning techniques can be used for both retrieval-based or generative models, but research seems to be moving into the generative direction. Deep Learning architectures like Sequence to Sequence are uniquely suited for generating text. Few example includes Retrieval-based models which use a repository of predefined responses and some kind of heuristic to pick an appropriate response based on the input and context. The heuristic could be as simple as a rule-based expression match, or as complex as an ensemble of Machine Learning classifiers. These systems don't generate any new text, they just pick a response from a fixed set while other such as Generative models don't rely on pre-defined responses. They generate new responses from scratch. Generative models are typically based on Machine Translation techniques, but instead of translating from one language to another, we "translate" from an input to an output (response).

User can use image or 3D character to represent himself or herself. This should be able to express different facial poster, neck movement and body movement. It is always easy to give body moment using skeleton animation.

Skeletal animation is a technique in computer animation in which a character (or other articulated object) is represented in two parts: a surface representation used to draw the character (called skin or mesh) and a hierarchical set of interconnected bones (called the skeleton or rig) used to animate the mesh Rigging is making our characters able to move. The process of rigging is we take that digital sculpture, and we start building the skeleton, the muscles, and we attach the skin to the character, and we also create a set of animation controls, which our animators use to push and pull the body around. While Setting up a character to walk and talk is the last stage before the process of character animation can begin. This stage is called 'rigging and skinning' and is the underlying system that drives the movement of a character to bring it to life. Rigging is the process to setting up a controllable skeleton for the character that is intended for animation. Depending on the subject matter, every rig is unique and so is the corresponding set of controls.

Skinning is the process of attaching the 3D model (skin) to the rigged skeleton so that the 3D model can be manipulated by the controls of the rig. In case of 2D character, 2D mesh is generated on which the character image is linked and the bones are attached to different points giving it, degree of freedom to move the character's body part/s. Animate a character can be produced with predefined controllers in rigging to move, scale and rotate in different angels and directions for realistic feel as to show a real character in computer graphics.

The feature extraction model recognizes a face, shoulders, elbows, hands, a waist, knees, and feet from the user shape, it extracts feature points with respect to the face, both shoulders, a chest, both elbows, both hands, the waist, both knees, and both feet. Accordingly, the user skeleton may be generated by connecting the feature points extracted from the user shape.

In general, the skeleton may be generated by recognizing many markers attached on a lot of portions of a user and extracting the recognized markers as feature points. However, in the exemplary embodiment, the feature points may be extracted by processing the user shape within the user image by an image processing method, and thus the skeleton may easily be generated. The extractor, extracts feature points with respect to eyes, a nose, an upper lip center, a lower lip center, both ends of lips, and a center of a contact portion between the upper and lower lips. Accordingly, a user face skeleton may be generated by connecting the feature points extracted from the user face. If the user face skeleton extracted from the user image is animated to generate animated user image/virtual model.

The invention is further explained through various illustrations.

Figure 1:
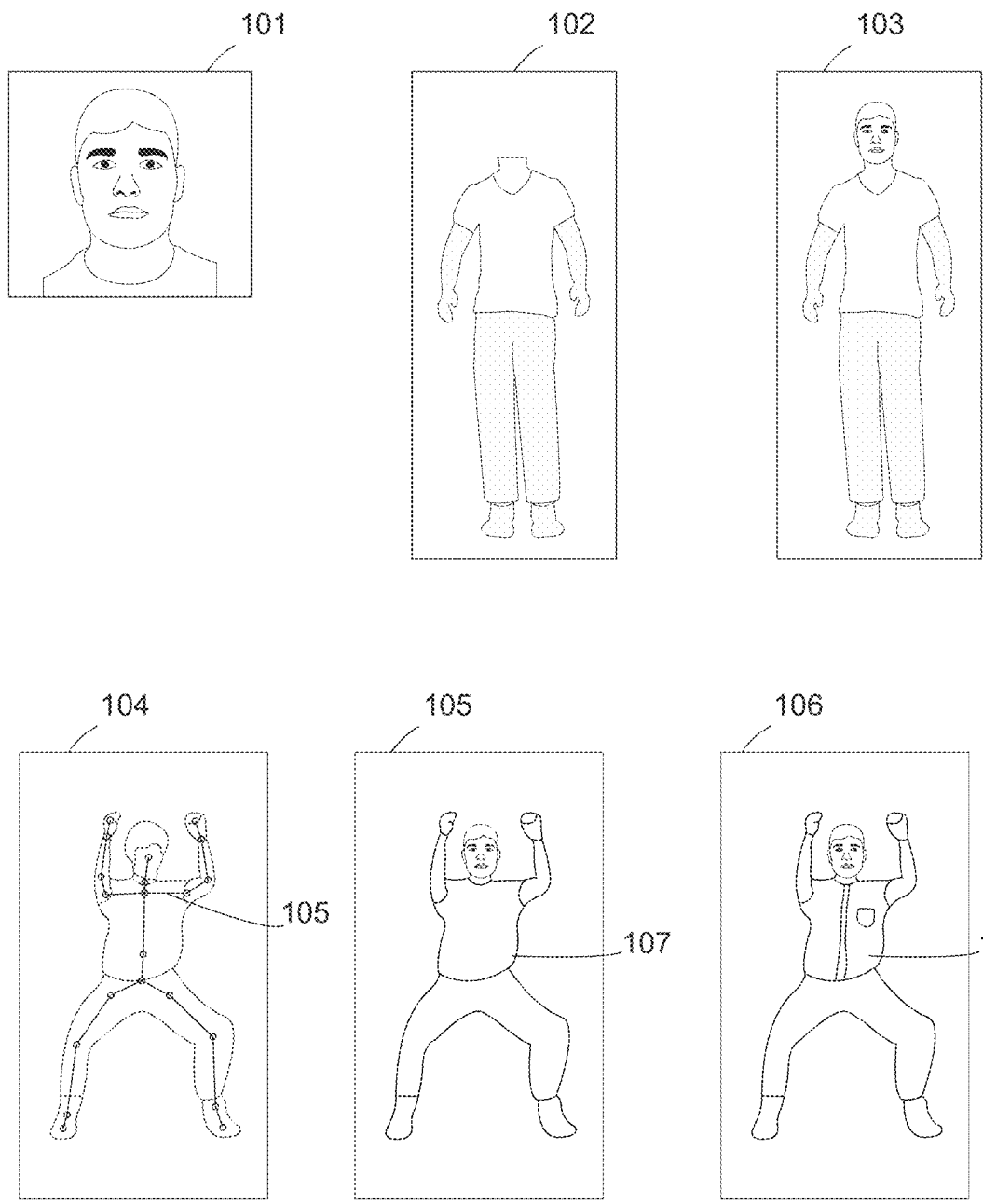
FIG. 1 illustrates an example of creating a body model from an image of user and extracting skeleton data and giving animation to body model of person.

FIG. 1 illustrates an example of creating a body model from an image of user and extracting skeleton data and giving animation to body model of person. 101 shows the photo/image of user, 102 is the body of other person which is used by system as per the user input regarding body shape and size and processed to produce body model of person 103. 104 shows the extracted skeleton data of body model and 105 is given a movement to body model. 106 represent the change of cloth of the user.

Figure 2:
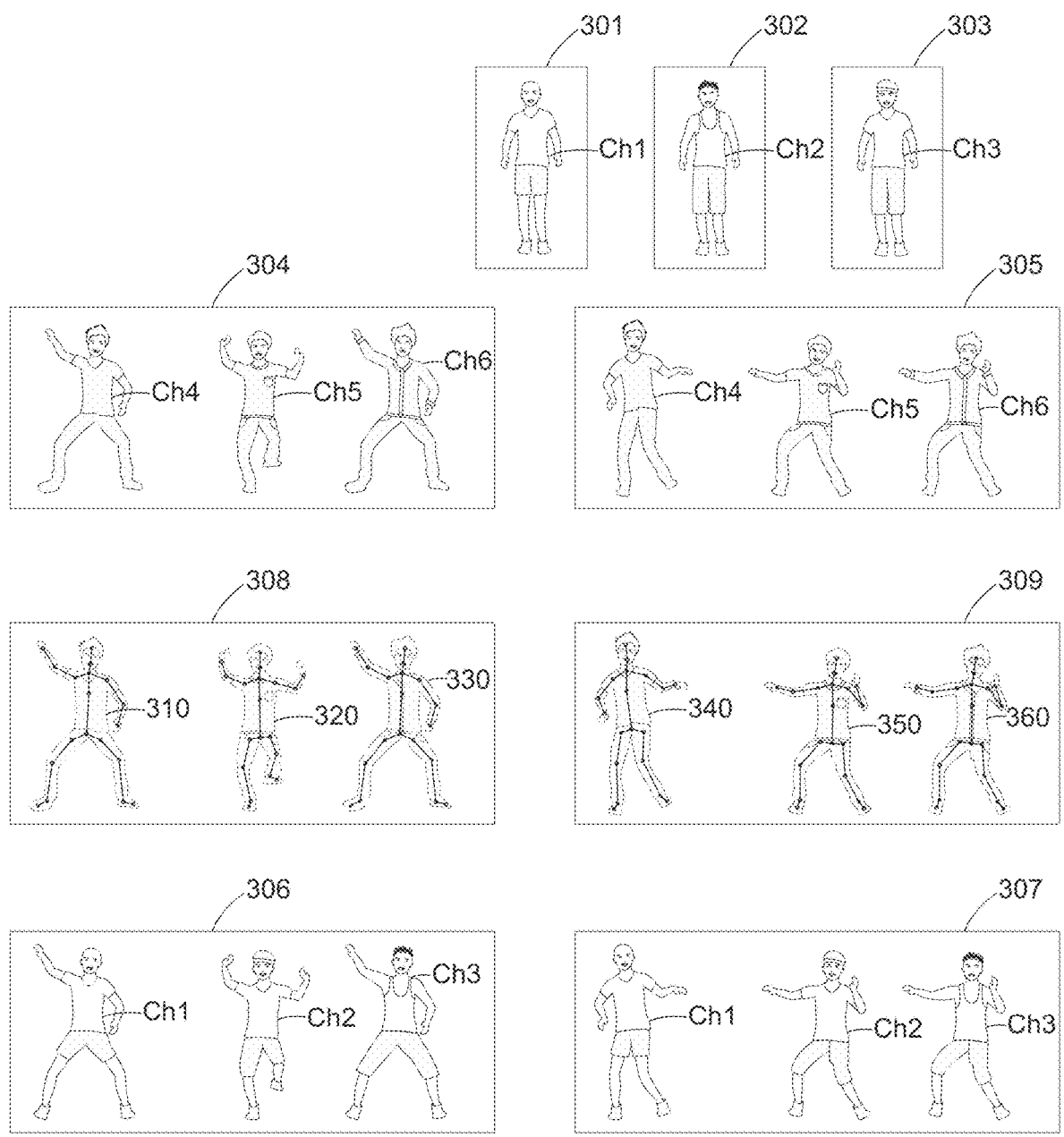
FIG. 2 illustrates an example of creating a body movement video scene involving three different characters by using image of three different characters, and text and/or audio and/or video.

FIG. 2 illustrates an example of creating a body movement video scene involving three different characters by using images 301. 302, 303 of three different characters ch1, ch2, ch3, and a video having two frames 304, 305 of characters ch4, ch5, ch6. The two frames 304, 305 of video have three different characters ch4, ch5, ch6 dancing. The frames 304, 305 are processed to identify bone structure 310, 320, 330 of the characters ch4, ch5, ch6 in the frame 304 and bone structures 340, 350, 360 of the characters ch4, ch5, ch6 in the frame 305. These bone structures are further mapped onto the characters ch1, ch2, ch3 to produce two processed frames 306, 307. This provides with similar video as of the characters ch4, ch5, ch6, but replaced by the characters ch1, ch2, and ch3.

Figure 3:
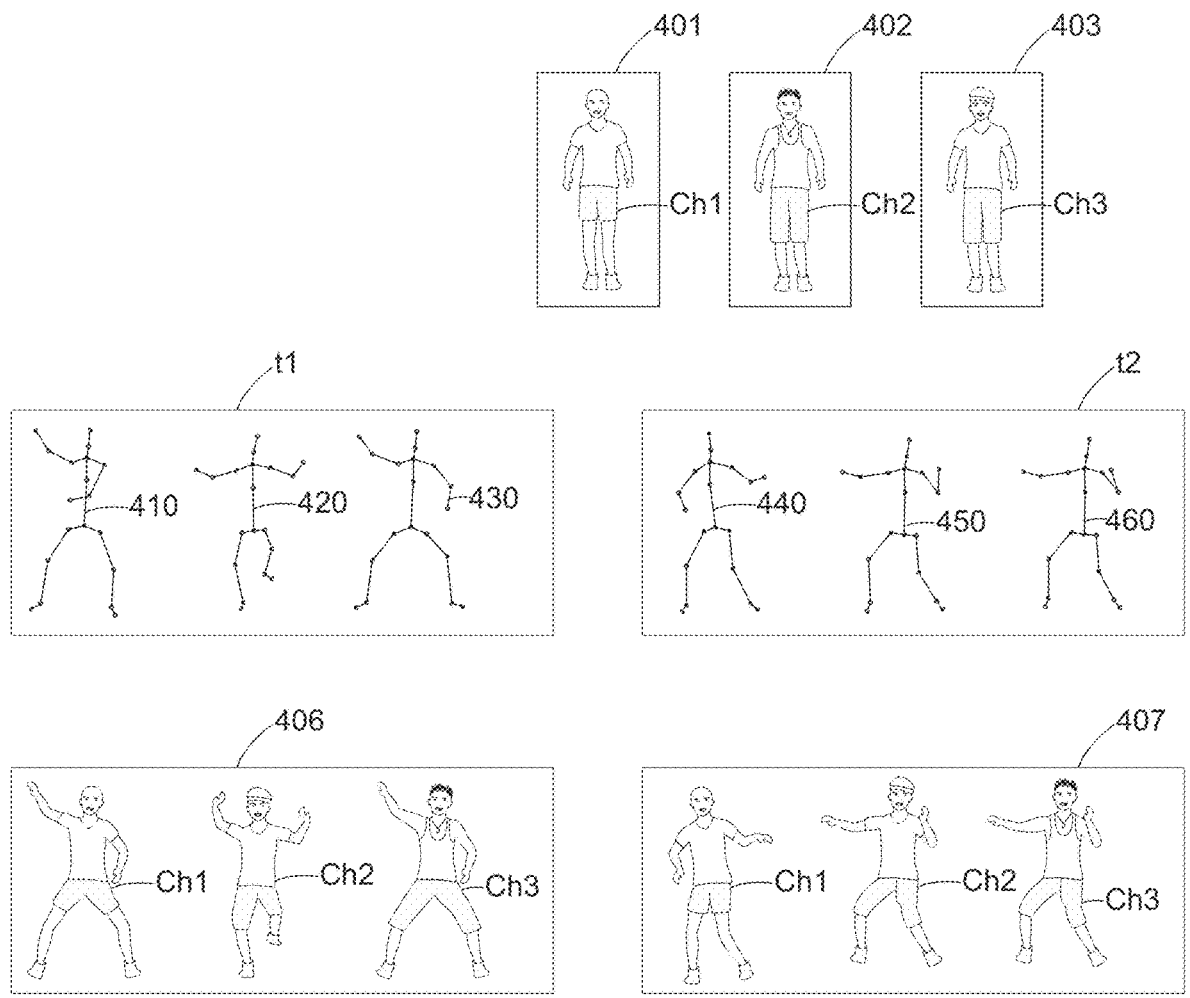
FIG. 3 illustrates an example of creating a body movement video scene involving three different characters by using images of three different characters, and instructions regarding body movements of each the characters bound by time and spatial movement in the background of the scene.

FIG. 3 illustrates an example of creating a body movement video scene involving three different characters by using images 401. 402, 403 of three different characters ch1, ch2, ch3, and instructions regarding body movements of each the characters ch1, ch2, ch3 bound by time and spatial movement in the background of the scene. A user instructs for a background to be chosen for creating the scene. Further, instructions for using a particular bone structure at time frame by particular character is made. Accordingly, on basis of such structure at time frame t1, bone structure 410 is selected for character ch1, bone structure 420 is selected for character ch2, and bone structure 430 is selected for character ch3. The placement of the bone structures 410, 420, 430 is shown in a bone processed frame 404. Once these bone structures 410, 420, 430 are placed on characters ch1, ch2, ch3, a processed frame 406 is generated having characters ch1, ch2, ch3 with desired body movement. Also, at time frame t2, bone structure 440 is selected for character ch1, bone structure 450 is selected for character ch2, and bone structure 460 is selected for character ch3. The placement of the bone structures 440, 450, 460 is shown in bone processed frame 405. Once these bone structures 440, 450, 460 are placed on characters ch1, ch2, ch3, a processed frame 407 is generated having characters ch1, ch2, ch3 with desired body movement. The processed frames 406, 407 are sequential in nature, with processed frame 406 occurring before processed frame 407, thus making a complete video scene of two processed frames 406, 407 when displayed sequentially.

Figure 4:
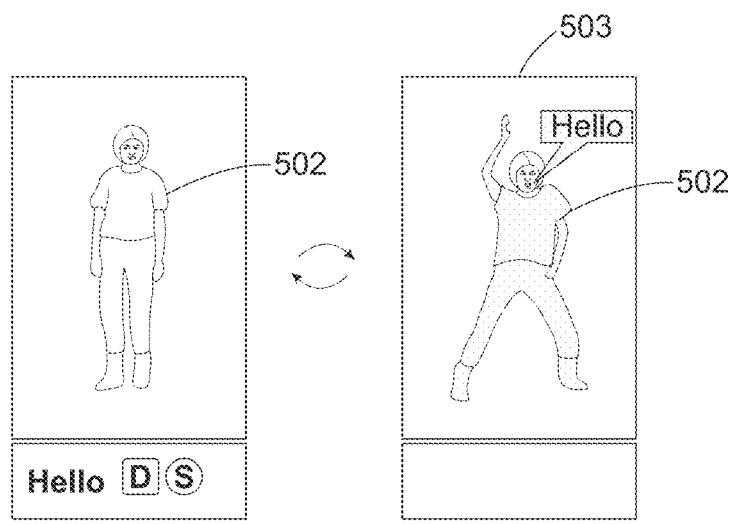
FIG. 4 illustrates an example of generating body movement and facial expression onto a receiver's mobile device using image, and text and/or audio and/or video.

FIG. 4 illustrates an example of generating body movement and facial expression onto a receiver's mobile device using image, and text and/or audio and/or video. A sender mobile device 501 is showing a character 502. The sender types in "Hello" and selects icon D for dance at senders mobile device 501. The image 501, the message "Hello" and the icon D is sent to the receiver mobile device 503. There is a predetermined bone structure assigned to the dance D, rather multiple bone structures may be assigned to complete the body movement assigned for the dance icon D, At the receiver mobile device 503, one of the frame of the body movement assigned to the dance icon D is displayed along with facial structure to speak out "Hello" from the character 502. The image 501, the message "Hello" and the icon D are processed at the receiver mobile device 503 to produce a video speaking hello along with realistic body movement related to dance icon D.

Figure 5:
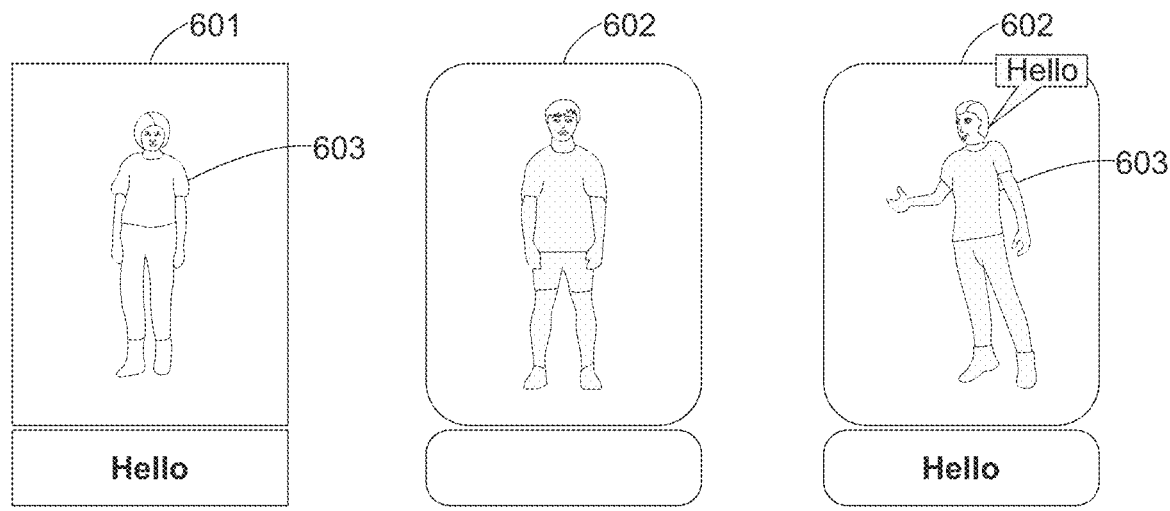
FIG. 5 illustrates an example of generating body movement where two virtual bodies physically interacts onto a receiver's mobile device using image, and text and/or audio and/or video.
Figure 5:
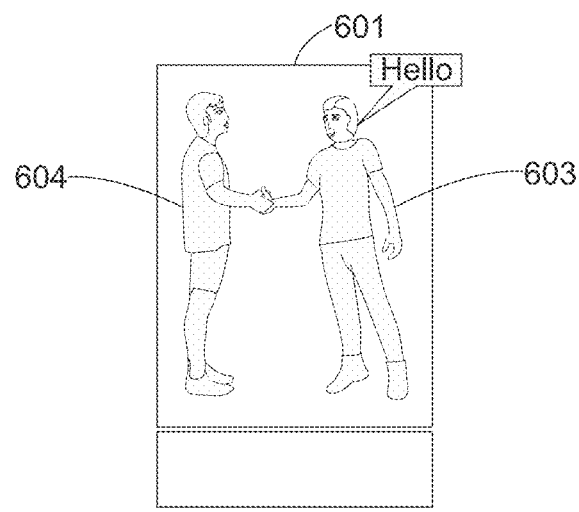

FIG. 5 illustrates an example of generating body movement where two virtual bodies physically interacts onto a receiver's mobile device using image, and text and/or audio and/or video. Two mobile device 601, 602 are shown displaying two characters 603, 604. At time frame t1, the user of first mobile device 601 writes "hello" in a text space provided on the display of the first mobile device 601. The text "hello" along with the image of first character 603 is sent to the second mobile device 602. It get processed at the second mobile device 602 to provide a video of saying "hello" by the first character 603, having face expressions on the face of the first character 603 and body movements onto the body of the first characters. There is a particular set of body movements assigned to greeting "hello" along with the face expressions. On the basis of pre-assigned body movements which involves various bone structures, the bone structures are mapped onto the image of the first character 603. Also, on basis of pre-assigned facial expression involving movement of lips, movements of other facial regions sequentially to greet "hello", a sequence of facial movements of various facial regions are mapped onto the face of the character 601. The set of sequential body movements and sequential facial movements of the character 603 are processed together to form a video to bring out requisite body movements along with facial expression to greet "hello". One of the frames 605 of the video of greeting "hello" by the first character 603 at the second mobile device 602 is shown with side posture of the character 603 extending his hand and speaking out "hello". In the same frame 605, in a text writing space at the second mobile device 602, the second user too writes "hello". The message "hello" along with image of the first characters leaves from the second mobile device 602 to the first mobile device 601. At the first mobile device 601, the previously sent "hello" from the first mobile device 601 and recently received "hello" from the second mobile device 602 are processed along with images of characters 603 and 604, to make a video of greeting each other. When two persons are greeting each other with "hello", a sequence of body movements are pre-assigned to create a scene of "handshake", where two bodies move in side posture opposite to each other and raise their hands from initial position to the hand shaking position and then to make a handshake where the palms of the bodies overlaps. To create the scene, bone structure assigned to the series of body movements are assigned to each of the characters 603, 604. The sequential movements in face regions and lips assigned to greeting "hello" between two persons are also further mapped on faces of the characters 603 and 604 to generate face expressions. The face expressions and the body movements are processed together to create a video scene of greeting "hello" between two persons is created at the first mobile device 601. One such frame 606 is shown at the first mobile device 601. In one embodiment, the similar video scene of greeting between two characters can be created at the second mobile device 602, by processing the image of the first character 603 and the message "hello" received from the first mobile device 601 earlier, and the image of the second character 604 and the message "hello" being sent by the second mobile device 602.

Figure 6:
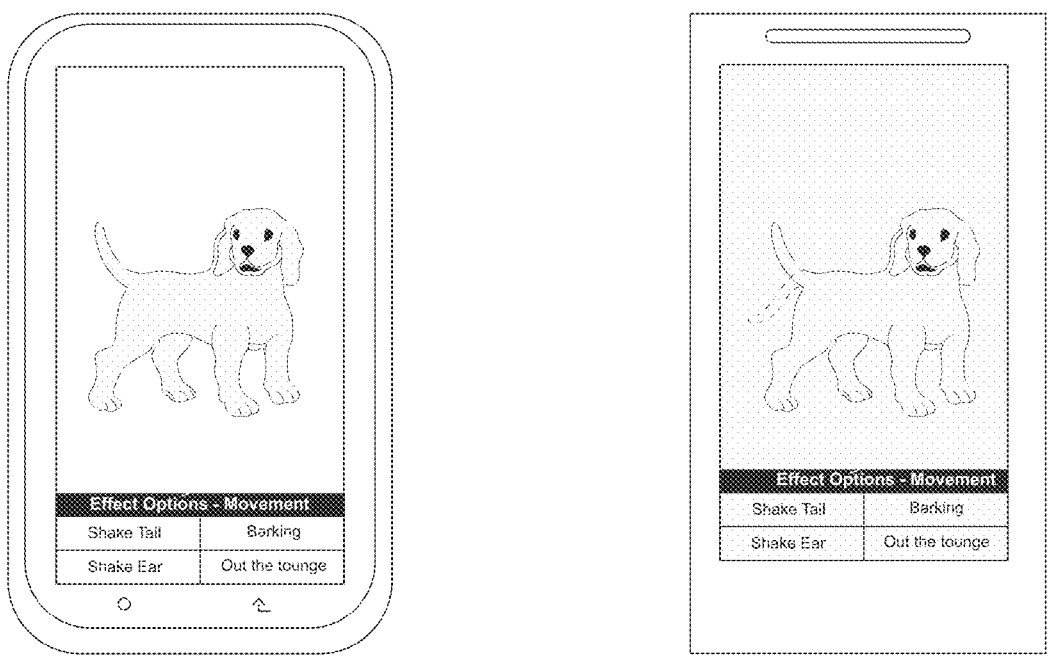
FIG. 6 illustrates an example of body part movement.

FIG. 6 illustrates an example of body part movement of an animal. The system enables the user to select effect options 701, say shake tail for displaying movement in tail part of an animal such as dog in an image. The selection automatically produces operational instructions which are embedded in the message. The message when received by the recipient device is outputted in an audio-visual form producing effects of video message, where the dog speaks the message with synchronized facial regions and lips movement and additionally with moving tail 702 at particular interval according to the operational instructions.

Figure 7:
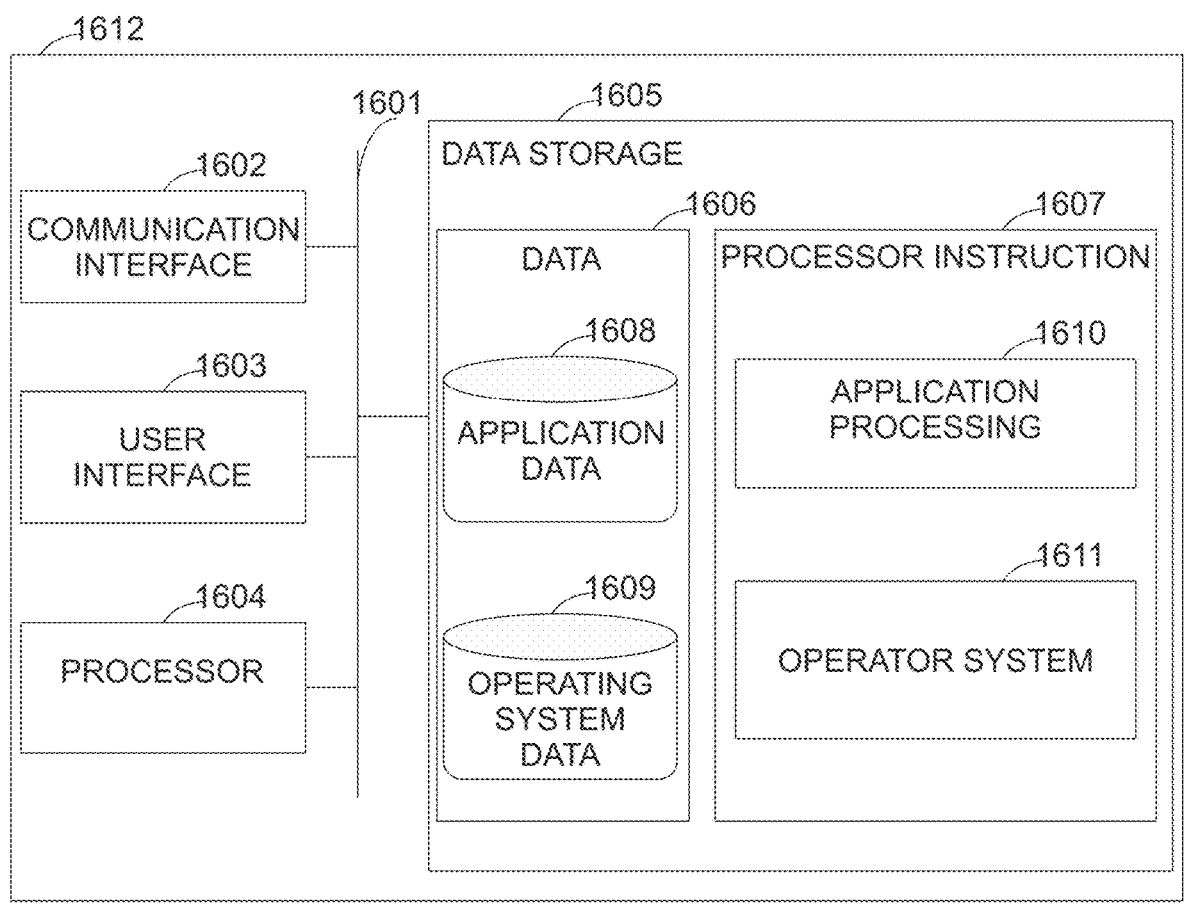
FIG. 7 illustrates the system diagram.

FIG. 7 illustrates another example of realistic body movement and facial expression rendering where a user is chatting to an offline user. A list 801 of question and answers is shown which is filled by a user to be used to introduce himself on a chat board 802 whenever he is offline or not connected to a person. The answers to the questions filled by the user can be divided into two categories, namely, public and private. Answers to the public category is available for anyone approaching the offline user, while answers to the private questions is available to only the selected user. Also, optionally a body movement is assigned to each of the answers. The chat board 802 at the receiver's end is divided into two parts 803 and 804. An image of the user with full body and face, who filled the question and answers in the list 801 appears in the part 803, while part 804 has an area where receiver is allowed to write. Various questions asked by receiver and the answers given by the users video having realistic face expression and body movement is provided in sequence 810, 820, 830, 840, of the chat board 801. The receiver here is the one who is only able to receive answers to the questions which are categorized as public here. In the sequence 130, the receiver raises the question to the offline user, "Which car do you own?" To which, in sequence 820, the video which is generated from the image of the offline user and the answer "BMW" with realistic facial expression of pride and body movement of "thumbs up", is displayed. Further, in the sequence 830, the receiver raises the question to the offline user, "What is your wife name?" To which, in sequence 840, the video which is generated from the image of the offline user and the answer "Sorry! This a private question"" with realistic facial expression of being helpless and body movement of hands crossed to the chest, is displayed.

In an embodiment, the invention has an application in social media networking. A user of a social media can post an image with a text on his profile page, or may send an image with text on a chat to a receiver. The image gets processed into a video having realistic facial expression based on a face identified in the image and the text. The text here can be replaceable by an audio. Even the text can be replaceable by another video where another face identified in the video get replaced by the face identified in the image to display at the receiver end a processed video having the face from the image having all realistic expressions of the face replaced from the video. All the examples and embodiments presented in FIG. 1-7 are applicable to social media networking.

Similarly, all the examples and embodiments of FIG. 1-7 are applicable to mobile to mobile device communications.

FIG. 14 is a simplified block diagram showing some of the components of an example client device 1612. By way of example and without limitation, client device is a any device, including but not limited to portable or desktop computers, smart phones and electronic tablets, television systems, game consoles, kiosks and the like equipped with one or more wireless or wired communication interfaces. 1612 can include memory interface, data processor(s), image processor(s) or central processing unit(s), and peripherals interface. Memory interface, processor(s) or peripherals interface can be separate components or can be integrated in one or more integrated circuits. The various components described above can be coupled by one or more communication buses or signal lines.

Sensors, devices, and subsystems can be coupled to peripherals interface to facilitate multiple functionalities. For example, motion sensor, light sensor, and proximity sensor can be coupled to peripherals interface to facilitate orientation, lighting, and proximity functions of the device.

As shown in FIG. 14, client device 1612 may include a communication interface 1602, a user interface 1603, and a processor 1604, and data storage 1605, all of which may be communicatively linked together by a system bus, network, or other connection mechanism.

Communication interface 1602 functions to allow client device 1612 to communicate with other devices, access networks, and/or transport networks. Thus, communication interface 1602 may facilitate circuit-switched and/or packet-switched communication, such as POTS communication and/or IP or other packetized communication. For instance, communication interface 1602 may include a chipset and antenna arranged for wireless communication with a radio access network or an access point. Also, communication interface 1602 may take the form of a wireline interface, such as an Ethernet, Token Ring, or USB port. Communication interface 1602 may also take the form of a wireless interface, such as a Wifi, BLUETOOTH®, global positioning system (GPS), or wide-area wireless interface (e.g., WiMAX or LTE). However, other forms of physical layer interfaces and other types of standard or proprietary communication protocols may be used over communication interface 102 Furthermore, communication interface 1502 may comprise multiple physical communication interfaces (e.g., a Wifi interface, a BLUETOOTH® interface, and a wide-area wireless interface).

Wired communication subsystems can include a port device, e.g., a Universal Serial Bus (USB) port or some other wired port connection that can be used to establish a wired connection to other computing devices, such as other communication devices, network access devices, a personal computer, a printer, a display screen, or other processing devices capable of receiving or transmitting data. The device may include wireless communication subsystems designed to operate over a global system for mobile communications (GSM) network, a GPRS network, an enhanced data GSM environment (EDGE) network, 802.x communication networks (e.g., WiFi, WiMax, or 3 G networks), code division multiple access (CDMA) networks, and a Bluetooth™ network. Communication subsystems may include hosting protocols such that the device may be configured as a base station for other wireless devices. As another example, the communication subsystems can allow the device to synchronize with a host device using one or more protocols, such as, for example, the TCP/IP protocol, HTTP protocol, UDP protocol, and any other known protocol.

User interface 1603 may function to allow client device 1612 to interact with a human or non-human user, such as to receive input from a user and to provide output to the user. Thus, user interface 1603 may include input components such as a keypad, keyboard, touch-sensitive or presence-sensitive panel, computer mouse, joystick, microphone, still camera and/or video camera, gesture sensor, tactile based input device. The input component also includes a pointing device such as mouse; a gesture guided input or eye movement or voice command captured by a sensor, an infrared-based sensor; a touch input; input received by changing the positioning/orientation of accelerometer and/or gyroscope and/or magnetometer attached with wearable display or with mobile devices or with moving display; or a command to a virtual assistant.

Audio subsystem can be coupled to a speaker and one or more microphones to facilitate voice-enabled functions, such as voice recognition, voice replication, digital recording, and telephony functions.

User interface 1603 may also be configured to generate audible output(s), via a speaker, speaker jack, audio output port, audio output device, earphones, and/or other similar devices, now known or later developed. In some embodiments, user interface 1603 may include software, circuitry, or another form of logic that can transmit data to and/or receive data from external user input/output devices. Additionally or alternatively, client device 112 may support remote access from another device, via communication interface 1602 or via another physical interface.

I/O subsystem can include touch controller and/or other input controller(s). Touch controller can be coupled to a touch surface. Touch surface and touch controller can, for example, detect contact and movement or break thereof using any of a number of touch sensitivity technologies, including but not limited to capacitive, resistive, infrared, and surface acoustic wave technologies, as well as other proximity sensor arrays or other elements for determining one or more points of contact with touch surface. In one implementation, touch surface can display virtual or soft buttons and a virtual keyboard, which can be used as an input/output device by the user.

Other input controller(s) can be coupled to other input/control devices, such as one or more buttons, rocker switches, thumb-wheel, infrared port, USB port, and/or a pointer device such as a stylus. The one or more buttons (not shown) can include an up/down button for volume control of speaker and/or microphone.

The computer system can include clients and servers. A client and server are generally remote from each other and typically interact through a network. The relationship of client and server arises by virtue of computer programs running on the respective computers and having a client-server relationship to each other.

One or more features or steps of the embodiments can be implemented using an Application Programming Interface (API). An API can define on or more parameters that are passed between a calling application and other software code (e.g., an operating system, library routine, function) that provides a service, that provides data, or that performs an operation or a computation.

Processor 1604 may comprise one or more general-purpose processors (e.g., microprocessors) and/or one or more special purpose processors (e.g., DSPs, CPUs, FPUs, network processors, or ASICs).

Data storage 1605 may include one or more volatile and/or non-volatile storage components, such as magnetic, optical, flash, or organic storage, and may be integrated in whole or in part with processor 1604. Data storage 1605 may include removable and/or non-removable components.

In general, processor 1604 may be capable of executing program instructions 1607 (e.g., compiled or non-compiled program logic and/or machine code) stored in data storage 1505 to carry out the various functions described herein. Therefore, data storage 1605 may include a non-transitory computer-readable medium, having stored thereon program instructions that, upon execution by client device 1612, cause client device 1612 to carry out any of the methods, processes, or functions disclosed in this specification and/or the accompanying drawings. The execution of program instructions 1607 by processor 1604 may result in processor 1604 using data 1606.

By way of example, program instructions 1607 may include an operating system 1611 (e.g., an operating system kernel, device driver(s), and/or other modules) and one or more application programs 1610 installed on client device 1612 Similarly, data 1606 may include operating system data 1609 and application data 1608. Operating system data 1609 may be accessible primarily to operating system 1611, and application data 1608 may be accessible primarily to one or more of application programs 1610. Application data 1608 may be arranged in a file system that is visible to or hidden from a user of client device 1612.

Figure 8:
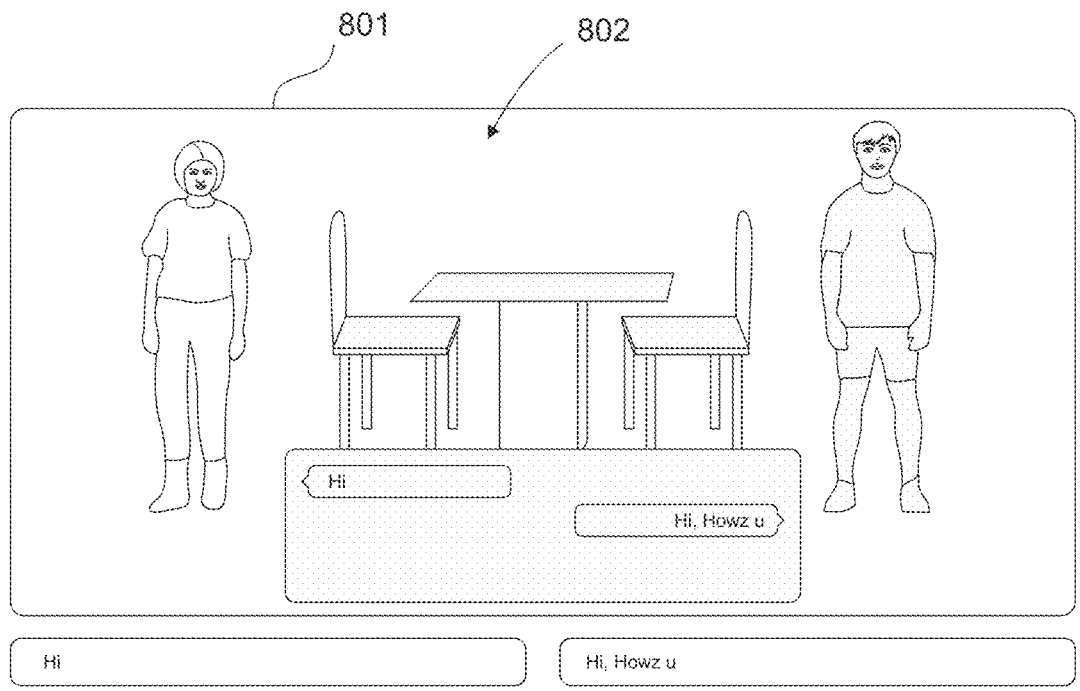
Figure 8:
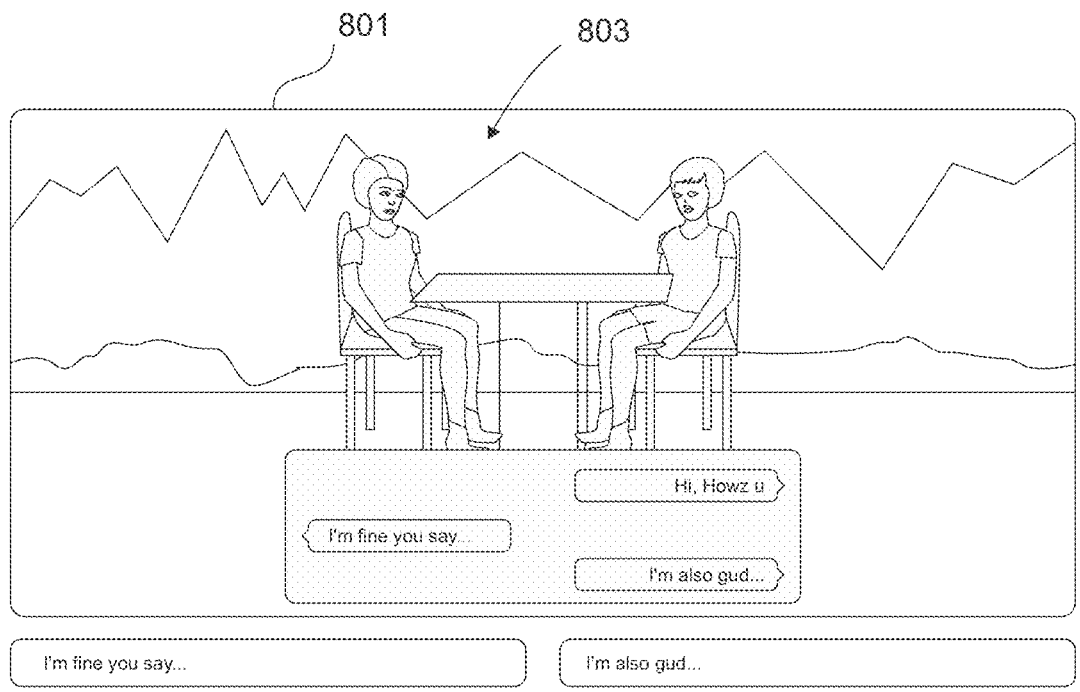
Figure 8:
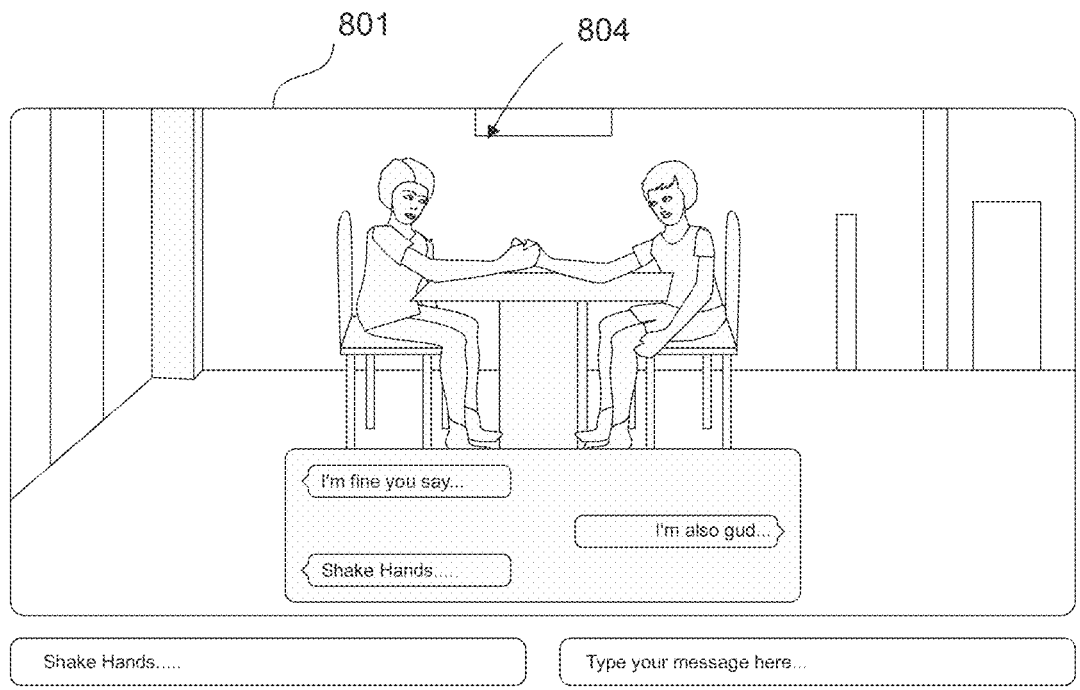

FIG. 8(*a*)-FIG. 8(*c*) illustrates mutual interaction of two users during chat and changing environment.

Figure 9:
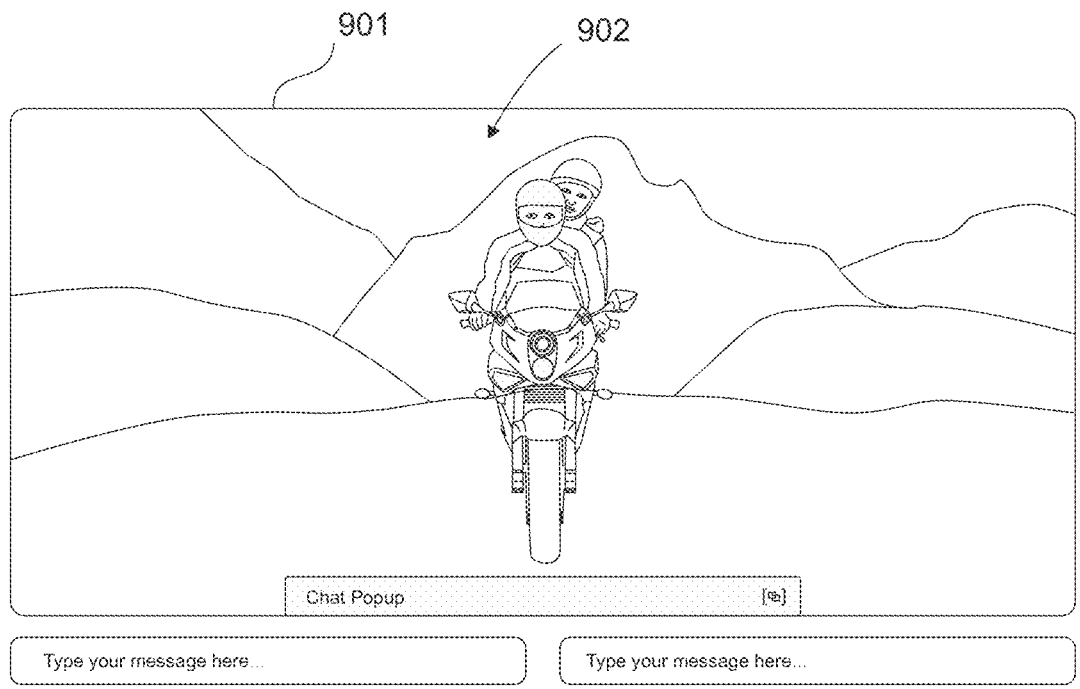
Figure 9:
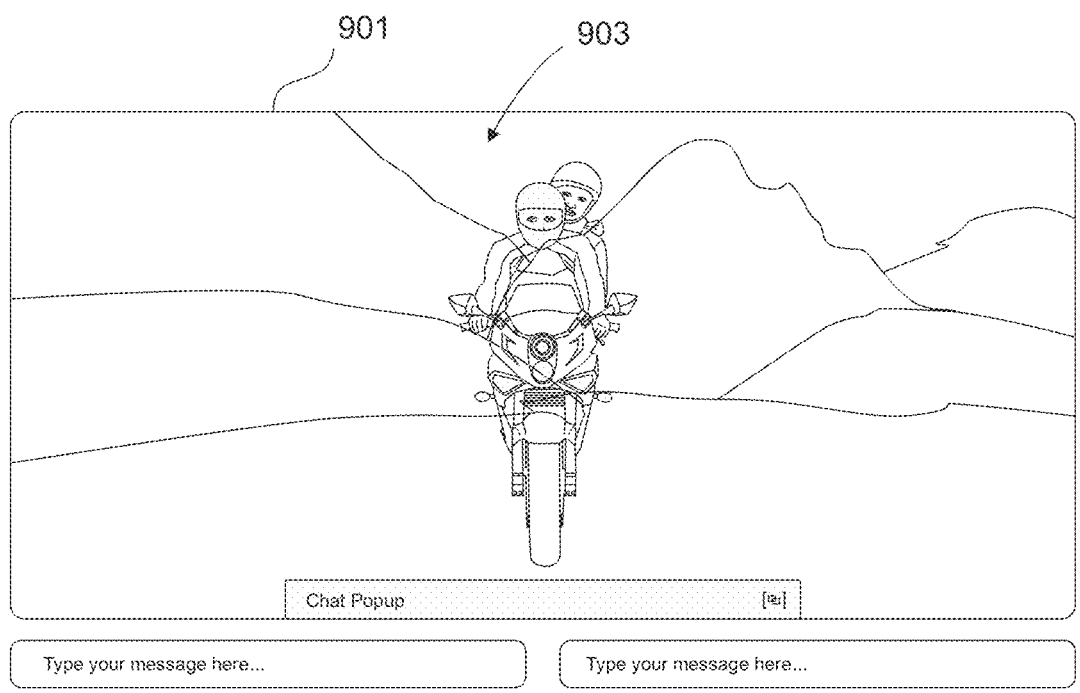

FIG. 9(*a*)-FIG. 9(*b*) illustrates mutual interaction of two users during chat and changing environment while they are driving bike.

Figure 10:
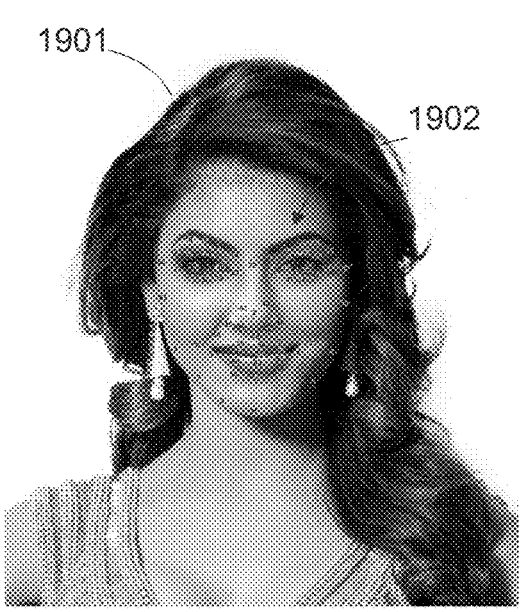
Figure 10:
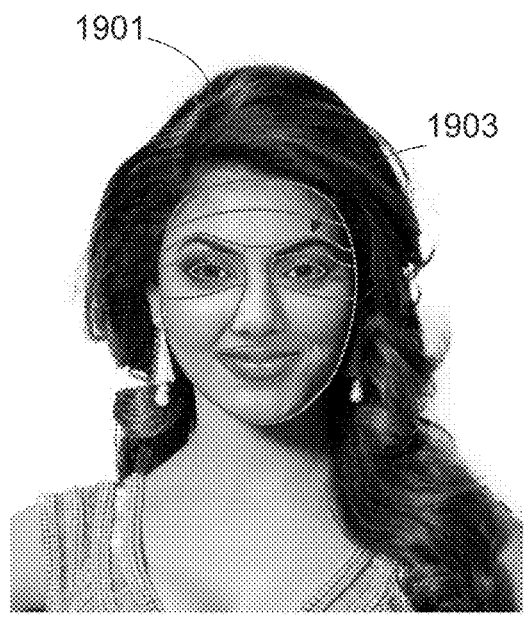
Figure 10:
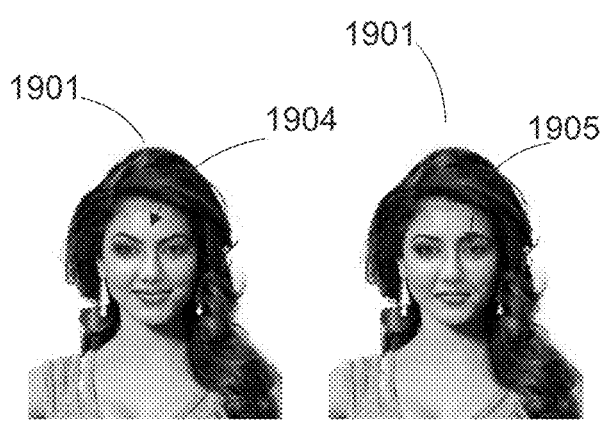
Figure 10:
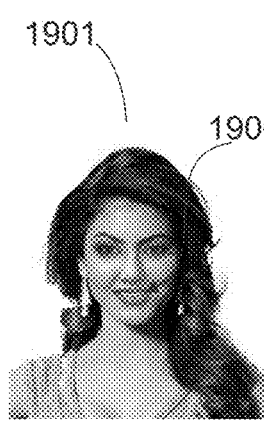
Figure 10:
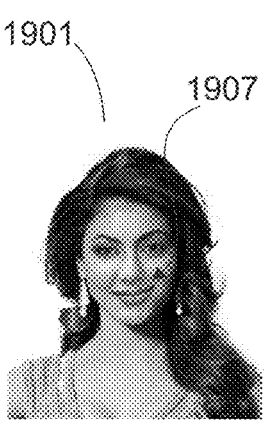

FIG. 10(*a*)-FIG. 10(*b*) illustrates the points showing facial feature on user face determined by processing the image using trained model to extract facial feature and segmentation of face parts for producing facial expressions while FIG.

10(c)-(f) shows different facial expression on user face produced by processing the user face.

FIG. 11(a)-FIG. (b) illustrates the user input of front and side image of face and FIG. 11(c) show the face unwrap produced by logic of making 3d model of face using front and side image of face.

FIG. 12(a)-FIG. 12(b) illustrates the face generated in different angle and orientation by generated 3d model of user face. Once the 3D model of face is generated then it can be rendered to produce face in any angle or orientation to produce user body model in any angle or orientation using other person's body part/s image in same or similar orientation and/or angle.

The invention claimed is:

1. A method for providing visual sequences using one or more images comprising:
    receiving one or more images of a first person showing at least one face of the first person,
    using a human body information to identify requirement of one or more body parts to generate a body model of the first person;
    receiving at least one image or photograph of the one or more body parts based on the identified requirement, wherein the one or more body parts belongs to one or more second persons or is generated based on image processing techniques;
    processing the one or more images of the first person with the at least one image or photograph of the one or more human body parts using the human body information to generate the body model of the first person, the body model comprises a face of the first person,
    receiving a message to be enacted by the first person, wherein the message comprises at least a text or an emotional and movement command,
    processing the message to extract or receive audio data related to a voice of the first person, and facial movement data related to an expression to be carried on the face of the first person,
    processing the body model of the first person, the audio data, and the facial movement data, and generating an animation of the body model of the first person enacting the message,
    wherein the emotional and movement command is a GUI or multimedia based instruction to invoke the generation of one or more facial expressions and/or one or more human body parts movement,
    wherein a trained model is utilized
    to make lips of the first person in one or more person images move in synchronization with the expression to be carried on the face of the first person, and
    to make human body part movements in the body model of the first person.

2. The method according to claim 1, wherein the message is received as an input from the first person.

3. The method according to claim 2, wherein the message comprises the audio data.

4. The method according to the claim 1, wherein the message comprises a body movement data related to movement of the one or more body parts of the first person, the method comprises:
    processing the body model, the audio data, the body movement data and the facial movement data, and generating an animation of the body model of the first person enacting the message with the movement of the one or more body parts.

5. The method according to the claim 1, comprising:
    processing the message and the audio data to producing a lip sync data;
    processing, the body model, the audio data, the facial movement data, the lip sync data and generating an animation of the body model of the first person enacting the message with lip sync.

6. The method according to the claim 1, wherein the one or more images of the first person comprises faces of more than one person including the face of the first person, the method comprising
    receiving messages to be enacted by the first person and other one or more persons shown in the one or more images, in an order,
    processing the messages to extract or receive the audio data related to voice of the first person and other one or more persons shown in the one or more images, and the facial movement data related to expressions to be carried on the faces of the first person and other one or more persons shown in the one or more images,
    processing body models of the first person other one or more persons shown in the one or more images, the audio data, and the facial movement data, and generating an animation of the body models of the first person other one or more persons shown in the one or more images, enacting the messages in the respective order as provided.

7. The method according to the claim 1, wherein the one or more images of the first person comprises faces of more than one person including the face of the first person, the method comprising:
    receiving a selection input to select the first person and other one or more persons shown in the one or more images,
    generating a scene showing one or more body models of the first person and other one or more persons shown in the one or more images with the faces based on the selection input,
    processing, the scene, the audio data, and the facial movement data, and generating an animation of the body models of the first person and other one or more persons shown in the one or more images enacting the message.

8. The method according to the claim 1, comprises:
    receiving a chat request made by a person with at least one another person,
    establishing a chat environment between the persons based on the chat request,
    receiving at least one image representative of at least one of the persons, wherein the image comprising at least one face of the person,
    using a human body information to identify requirement of the other human body part/s for the person whose face is present in the image;
    receiving at least one image or photograph of other human body part/s of other person different from the person whose face is present in the image, based on identified requirement;
    processing the image/s of the person with the image/s of other human body part/s using the human body information to generate body model/s of the person, the body model comprises a face of the person,
    receiving a chat message from at least one of the persons in the chat environment, wherein the chat message comprises at least a text or a emotional and movement command, processing the chat message to extract or receive the audio data related to voice of the person, and the facial movement data related to expression to be carried on the face of the person, processing the body model/s, the audio data, and the facial movement data, and generating the animation of the body model/s of the person/s enacting the chat message and displaying the animation in the chat environment, Wherein emotional and movement command is a GUI or multimedia based instruction to invoke the generation of facial expression/s and or body part/s movement.

9. The method according to claim 8, wherein the chat message from a first computing device is received at a second computing device, and processing the body model/s, the audio data, and the facial movement data, and generating the animation of the person enacting the chat message in the chat environment, and displaying the animation on a display of the second computing device in the chat environment.

10. The method according to the claim 9, comprising:
receiving at least one image representative of more than one first persons in the chat environment, using human body information related to each of the first persons whose images is received to identify requirement of the one or more body parts to generate body models of each of the first persons whose images are received;

receiving at least one image or photograph of the one or more body parts for each of the persons for whom other body part/s are required, wherein the one or body parts belongs to one or more second persons or is generated based on image processing techniques;

processing the images of the first persons with the images of the body parts using the human body information to generate body models of each of the first persons for whom the body parts are required, the body model comprises face of the first persons, processing the body models, images of the first persons for whom the body parts were not required and generating a scene showing the first persons in the chat environment, receiving a message from at least one of the first persons in the chat environment, wherein the message comprises at least a text or a emotional and movement command, processing the message to extract or receive the audio data related to voice of the first person from whom the message is received, and the facial movement data related to expression to be carried on the face of the first person from whom the message is received, processing the scene, the audio data, and the facial movement data, and generating an animation of the first persons enacting the message in the chat environment within the scene, Wherein emotional and movement command is a GUI or multimedia based instruction to invoke the generation of facial expressions and or body parts movement.

11. The method according to the claim 1, comprising:
receiving a wearing input related to a body part of the body model onto which a fashion accessory is to be worn;

processing the wearing input and identifying body part/s of the body model onto which the fashion accessory is to be worn;

receiving an image/video of the accessory according to the wearing input;

processing the identified body part/s of the body model and the image/video of the accessory and generating a view showing the body model wearing the fashion accessory, processing the view, the audio data, and the facial movement data, and generating an animation of the persons enacting the message wearing the fashion accessory.

12. The method according to the claim 1, comprising:
receiving a target image showing a face of another person or animal, processing the body model and the target image to generate a morphed body model showing the face from the target image on the person's body model, processing the morphed body model, the audio data, and the facial movement data, and generating an animation of the morphed body model enacting the message.

13. The method according to the claim 1, comprising:
receiving an image of a cloth;

Combining the body model of the first person and the image of the cloth to show the body model of the first person wearing the cloth.

14. The method according to the claim 1, comprising:
receiving an animation input related to nodes of skeleton of the body model, wherein the skeleton of the body model is thinned down structure of the body model;

processing the body model, the audio data, and the facial movement data, and generating an animation of the body model of the person enacting the message.

15. The method according to the claim 1, comprising:
receiving at least one image representative of more than one persons, using human body information related to each of the persons whose image/s is received to identify requirement of the other body part/s for each of the persons whose image/s is received;

receiving at least one image or photograph of other human body part/s of other person different from the person whose face is present in the image, for each of the persons for whom other body part/s are required;

processing the image/s of the person with the image/s of other human body part/s using the human body information to generate body models of each of the persons for whom the other body part/s are required, the body model comprises the face of the persons, processing the body models, images of the person/s for whom the other body part/s were not required and generating a scene showing the persons in the chat environment, receiving a message for mutual interaction among persons in the scene, wherein the message comprises at least a text or an emotional and movement command, processing the message to extract or receive the audio data related to voice of the person, and the facial movement data related to expression to be carried on the face of the person, processing the scene, the audio data, and the facial movement data, and generating an animation of the persons enacting the message within the scene, wherein emotional and movement command is a GUI or multimedia based instruction to invoke the generation of facial expression/s and or body part/s movement.

* * * * *